Figure 1:
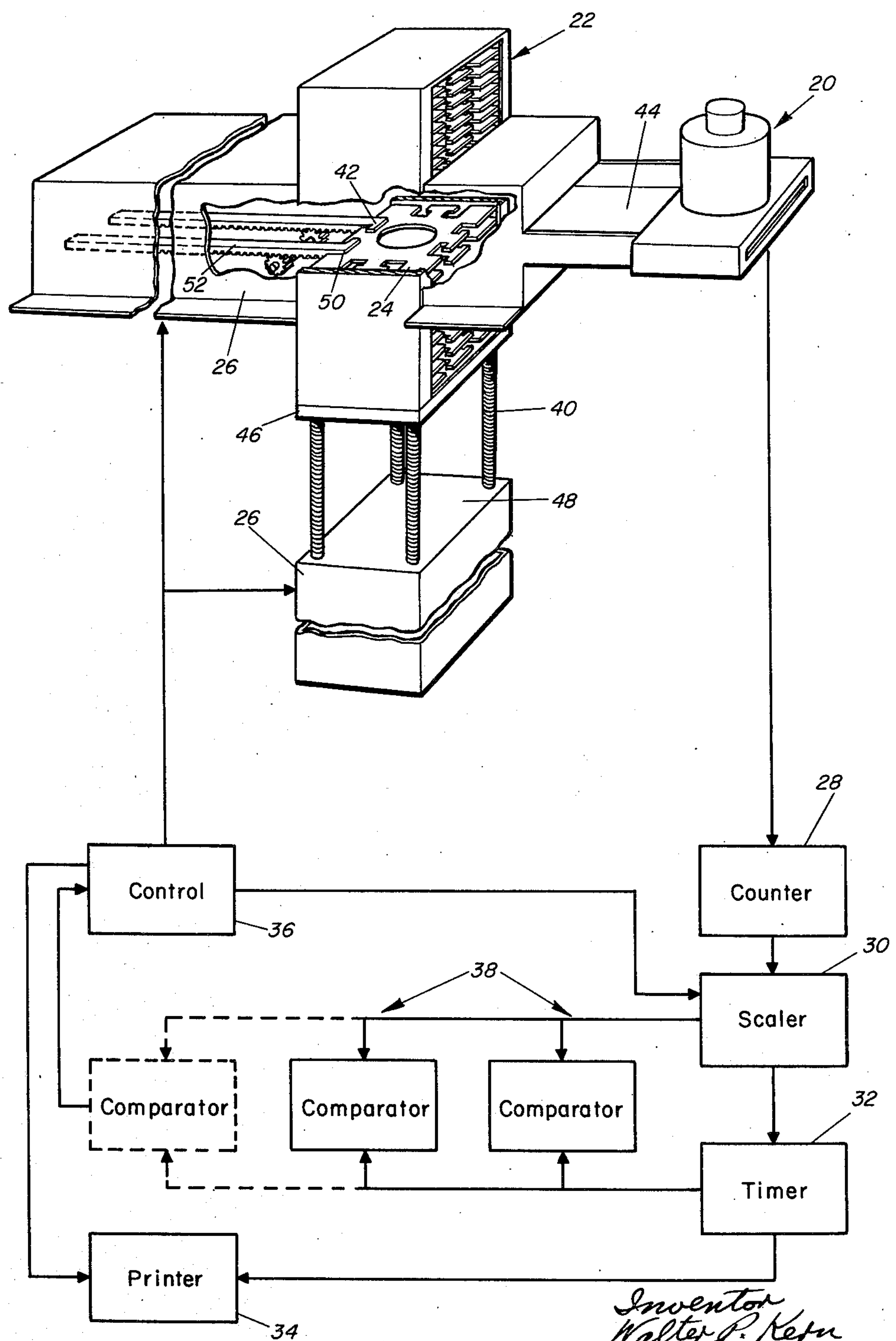

June 5, 1962 W. P. KERN 3,038,078

AUTOMATIC CONTROL FOR PROGRAMMING SAMPLE CHANGING IN RADIATION DETECTING SYSTEM

Filed Feb. 13, 1959 2 Sheets-Sheet 1

Inventor
Walter P. Kern
By
Morse & Altman

Inventor
Walter P. Kern
By
Morse & Altman

United States Patent Office 3,038,078

Patented June 5, 1962

3,038,078

AUTOMATIC CONTROL FOR PROGRAMMING SAMPLE CHANGING IN RADIATION DETECTING SYSTEM

Walter P. Kern, 672 Jerusalem Road, Cohasset, Mass.

Filed Feb. 13, 1959, Ser. No. 793,064
5 Claims. (Cl. 250—106)

The present invention relates to radiation detection and, more particularly, to a radiation counting system wherein successive data relating to the radioactivity of successive unknown samples is determined automatically. An automatic system for measuring the radioactivity of unknown samples generally comprises a plurality of holders for carrying the samples, a detector for measuring the radioactivity of samples carried by successive containers and a control for moving the successive containers to and from the detector. Customarily in the case of disintegration counting, a sample is permitted to remain in the detector for a period during which a preset number of counts occurs. This number of counts and the time span during which it occurs provides an indication of the radioactivity of the samples. Where sample changing occurs at the end of a recurring normal preset count, the preset count in the case of a very weak sample may require the lapse of a protracted period that undesirably delays determining the radioactivity of the remaining samples of a sequence. The present invention contemplates an automatic system within which the sample itself programs its own removal from the detector in the event that its radioactivity is such that its counting rate is within a preset range other than the normal preset range.

The object of the present invention is to provide a novel system of the foregoing type comprising a detector for generating pulses in response to a radioactive sample therewithin, a magazine of holders for carrying a sequence of such samples, a sequence control for positioning the holders sequentially in the detector and a program control for causing the sequence control to operate when the radioactivity of the sample within the detector falls within a predetermined range. Specifically, the program control includes a counter which generates signals in response to the detector, a timer which transmits signals at preselected intervals and one or more comparators, any of which is capable of actuating the sequence control when signals from the counter and the timer indicate a counting rate within a preset range. Thus, if within a given period of time, fewer than a preset number of counts occur, a sample change will occur before the normal counting cycle is completed. However, if within this given period of time, more than the preset number of counts occur, the normal preset count will be completed. In other words, the program control serves to determine approximately whether or not the sample falls within the range of radioactivity of interest.

Other objects of the present invention will in part be obvious and will in part appear hereinafter.

The invention accordingly comprises the apparatus possessing the construction, combination of elements and arrangement of parts, which are exemplified in the following detailed disclosure, and the scope of which will be indicated in the claims.

Figure 2:
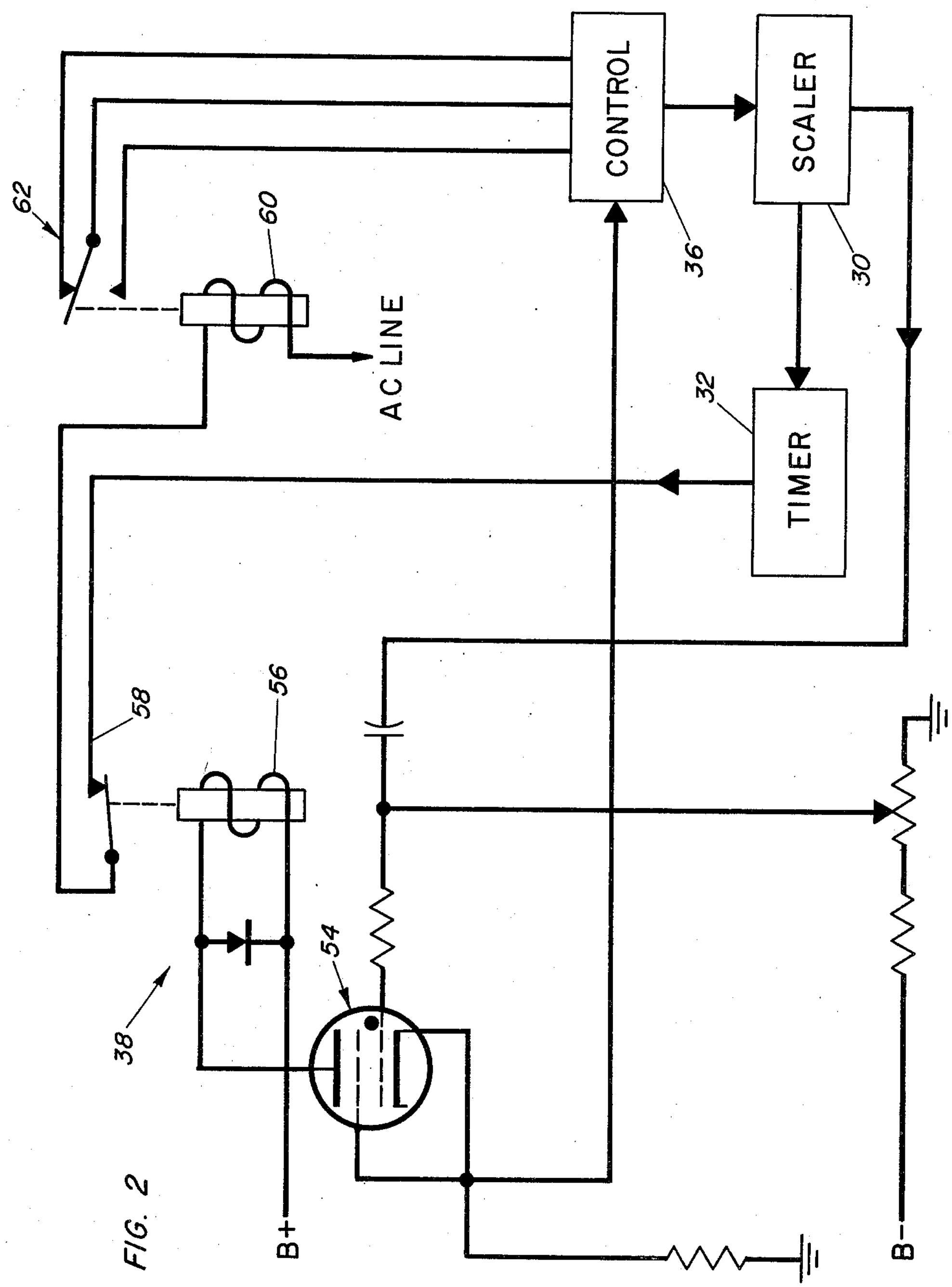

For a fuller understanding of the nature and objects of the present invention, reference should be had to the following detailed description, taken in connection with the accompanying drawings, wherein:

FIG. 1 is a diagrammatic view, partly in perspective and partly in block, of a system embodying the present invention; and FIG. 2 is a schematic diagram of certain of the components of the system of FIG. 1.

Generally, the illustrated embodiment of the present invention comprises a detector 20 for counting disintegrations in successive samples, a magazine 22 of stacked holders for the successive samples, a mechanical drive 26 for moving the holders to and from the detector in succession, a counter 28 responsive to pulses from the detector, a scaler 30 for producing pulses proportionally fewer than the pulses from the counter, a timer 32 for actuating a printer 34 when a normal number of pulses have been received from the counter, a sequence control 36 for actuating the mechanical drive when the timer is actuated and a program control 38 for actuating the timer and the mechanical drive before the normal number of counts has been received. In accrdance with the present invention, the program control includes a plurality of comparators, each of which is responsive to signals from scaler 30 and timer 32 in a manner which causes the sequence control to operate when the counting rate falls within one of several preset ranges.

As shown FIG. 1, a plurality of samples, held in dishes on sample holders 24, are sequentially advanced from magazine 22 from detector 20 in the following way. Magazine 22 may be stepped upwardly and downwardly by four lead screws 40, which depend from magazine 22 and are in mesh with associated gearing of drive 26. Any particular holder 24 of stack 22 may be directed from guides in magazine 22 by a pair of hooks 42 along a track 44 to and from detector 20. Detector 20 may be variously a Geiger counter, a proportional counter or a scintillation counter, as desired. In operation, initially magazine 22 is at its lowermost position with its base 46 in adjacence to the upper surface 48 of drive 26. At this point hooks 42 are mated with corresponding slots 50 at the edge of a particular holder 24. Holder 24 is directed along guide 44 into detector 20 by a gear and rack arrangement 52. The mechanisms of drive 26 are operated by sequence 36. Ordinarily, at the end of a normal count, control 36 causes rack and gear assembly 52 to return holder 24 from detector 20 to magazine 22 and causes magazine 22 to rise one step in order to mate notches 50 of the next holder with hooks 42. In turn, the next holder is advanced along track 44 into detector 20.

In accordance with the present invention, a plurality of comparators 38 are energized by scaler 30 and timer 32 in order to operate sequence control 36 at times other than at the end of a normal count. Specifically as indicated above, in the case of a very weak example, it may be undesirable to wait until the normal count has been reached because of the undue lapse of time that would be involved. The construction of a particular comparator is shown in FIG. 2 in association with sequence control 36, scaler 30 and timer 32. This comparator includes a thyratron stage 54 which may be triggered by a signal from scaler 30 at a predetermined count. It will be observed that when thyratron stage 54 conducts, relay 56 opens the circuit of a switch 58, which is connected to relay 60. Relay 60 controls a switch 62 that is in association with sequence control 36. When thyratron stage 54 conducts in response of a pulse from scaler 30, switch 58 is opened and a subsequent pulse from timer 32 is unable to open switch 62. In consequence, the normal number of counts is permitted to occur before timer 32 actuates printer 34. On the other hand, in the event that the counting rate of scaler 30 is too slow, timer 32 energizes relay 60, before relay 56 can operate switch 58. In consequence, switch 62 causes sequence control 36 to actuate drive 26.

Thus in operation, in sequence control 36 transfers a sample holder 24 to detector 20. Next counter 28, scaler 30 and timer 32 operate to cause printer 34 to record an elapsed time for a given count as an indication of the radioactivity of the sample. When, however, the radioactivity falls within a preselected range as determined by one of comparators 38, control 36 is energized before the normal number of counts has occurred.

Since certain changes may be made in the above system without departing from the scope of the object herein involved, it is intended that all matter disclosed herein or shown in the accompanying drawings be interpreted in an illustrative and not a limiting sense.

What is claimed is:

1. A system comprising a radioactive radiation detector, a plurality of sample holders, a sequence control for sequentially positioning the sample holders in said detector at a predetermined location, said detector being positioned to receive radiation from a sample in a sample holder at said predetermined location, and a program control for causing said sequence control to operate in accordance with a signal from said detector, said program control including a counter which transmits a first signal in response to said detector, a timer which transmits a second signal at preselected intervals, and at least one comparator for receiving said first signal and said second signal, said first signal normally actuating said sequence control, said second signal actuating said sequencing control.

2. The system of claim 1 wherein said sample holders are arranged in a vertical stack, means for varying the elevation of said stack and means for directing a sample holder at a given position with respect to said system from said stack to said detector.

3. A system comprising a detector, a plurality of sample holders, a sequence control for sequentially positioning the sample holders in said detector and a program control for causing said sequence control to operate in accordance with a signal from said detector, said program control including a counter which transmits a first signal response to said detector, a timer which transmits a second signal at preselected intervals, and at least one comparator, said comparator including a switch having terminal means and operating means, said terminal means normally connecting said timer to said program control, for application of said second signal thereto, said operating means disconnecting said timer from said program control in order to apply said first signal thereto when the number of counts received within a predetermined period is below a predetermined value.

4. A system comprising a radioactive radiation detector, a plurality of sample holders, a sequence control for sequentially positioning the sample holders in said detector at a predetermined location, said detector being positioned to receive radiation from a sample in one of said sample holders positioned at predetermined location, and a program control for causing said sequence control to operate in accordance with a signal from said detector, said program control including a counter which transmits a first signal in response to said detector, a timer which transmtis a second signal at preselected intervals, and at least one comparator which actuates the sequence control when the number of counts received within a given period is below a predetermined value, said comparator comprising a normally closed switch connecting said timer to said program control, and a solenoid operatively associated with said solenoid, and a thyratron stage for actuating said solenoid, said first signal being applied to said thyratron stage normally in order to energize said solenoid, said second signal being applied to said program control through said switch if said switch is closed when said second signal occurs.

5. A system comprising a radioactive radiation detector, a plurality of sample holders arranged in a vertical stack, a sequence control for varying the elevation of said stack and for directing a sample holder at a predetermined position with respect to said system from said stack to said detector, a program control for causing said sequence control to operate in accordance with a signal from said detector, said program control including a counter which transmits a first signal in response to said detector, a timer which transmits a second signal at preselected intervals, and at least one comparator which actuates the sequence control when the number of counts received within a given period is below a predetermined value, said comparator comprising a normally closed switch connecting said timer to said program control, a solenoid operatively associated with said comparator, and a thyratron stage for actuating said solenoid, said first signal being applied to said thyratron stage normally in order to energize said solenoid, said second signal being applied to said program control through said switch if said switch is closed when said signal occurs.

References Cited in the file of this patent

UNITED STATES PATENTS

| | | |
|---|---|---|
| 2,737,186 | Molins et al. | Mar. 6, 1956 |
| 2,800,131 | Molins et al. | July 23, 1957 |
| 2,826,076 | Boretz et al. | Mar. 11, 1958 |
| 2,843,753 | Meeder | July 15, 1958 |